United States Patent Office 3,493,499
Patented Feb. 3, 1970

3,493,499
FLOCCULATION OF SALINE SOLID
SUSPENSIONS
Mohamed A. Zeitoun, William F. McIlhenny, and Reece W. Murray, Lake Jackson, Tex., assignors to The Dow Chemical Company, Midland, Mich., a corporation of Delaware
No Drawing. Filed May 16, 1968, Ser. No. 729,562
Int. Cl. C02b 1/20
U.S. Cl. 210—49       6 Claims

ABSTRACT OF THE DISCLOSURE

Flocculation of solid suspensions in saline water is enhanced with a combination treatment involving applying to the suspension in sequence a high molecular weight, carboxylic polyelectrolyte, trivalent metal ion and then a second dose of a high molecular weight, carboxylic polyelectrolyte. When applied under flocculating conditions, with intervening mixing, the foregoing series of chemical treatments produces a large, rapidly settling floc which leaves low residuals of fines in the overhead. The settled floc is also highly stable to degradation by agitation.

---

Colloidal suspensions of solids in saline water are frequently generated by dredging, drilling and otherwise agitating the silt bottoms under saline or sea water. Through the action of natural water currents, such suspended solids may invade recreational waters or zones in which animal and plant life are harvested from sea water with serious detriment to the enjoyment and objects of such operations. Another problem associated with such suspensions is the impairment of visibility making underwater recovery operations and work projects very difficult.

It is an apparent desideratum of the art to provide means for clarifying solid suspensions in saline water, such as sea water. A special need is a process for the clarification of sea water of bottom silt solids, stirred up as by dredging, drilling and wave action, to avoid the impairment of water quality for any of a variety of uses ranging from recreational to productive purposes. A special object is to improve visibility in saline water by the efficient reduction of turbidity. A further object is to produce a mechanically stable floc in saline waters.

In the instant invention, a suspension of solids in a suspending medium of saline water, e.g. sea water, is clarified by a flocculation treatment comprising the application to the water in sequence of (1) a high molecular weight (flocculant grade) carboxylic polyelectrolyte, (2) trivalent metal ions and (3) another dose of a high molecular weight, carboxylic polyelectrolyte.

By "carboxylic polyelectrolyte" is meant a water-soluble polymer having along the polymer chain a plurality of ionizable carboxylate groups. By "high molecular weight" is meant a polymer having a weight average molecular weight of at least about 200,000.

Trivalent metal ions that may be used in the practice of the invention include ferric and aluminum ions. These ions are incorporated into the system to be treated in the form of a water-soluble iron or aluminum compound which yields, at the pH of the system treated, the desired metal ion. Most often, the ferric ions will be added as ferric chloride or ferric sulfate. Alternatively, the ferric ion may be incorporated as a ferrous salt, which due to the oxygen present in the water undergoes oxidation in situ to produce ferric ions. Similarly trivalent aluminum ion may be incorporated in the form of alkali metal aluminates, which at the pH of sea water undergo disassociation to produce aluminum ions in solution. The aluminum ions may be incorporated as aluminum sulfate (alum) or aluminum chloride.

Suspended solids flocculated in accordance with the invention are those which have been in contact with, and are suspended in, water containing dissolved salts, i.e. saline water. One source of such suspensions, which have proved extremely difficult to separate by flocculation, is the mud or silt found at the bottom of natural bodies of saline or sea water. Such silt is generally made up of small mineral particles such as clay, carbonates and quartz and to some extent organic matter. When resuspended by agitation, as is produced by the dredging of the bottom underlaying sea water, the silt is resuspended and will remain so for extended periods with the adverse consequences described above.

When treated in accordance with the invention, a small amount of the high molecular weight, carboxylic polyelectrolyte is incorporated into the suspension. The dose will be within the range from about 0.1 to about 20 parts by weight per million of the system treated. Usually it is from about 5 to 15 p.p.m. Dispersion of the polymer is accomplished best by the application of a dilute solution of the polymer to the water treated. In streams, the applicating point may be fixed with the polymer being introduced as a dilute aqueous solution containing from about 100 to about 10,000 parts per million by weight of the flocculant. Under non-dynamic conditions, some means of dispersing the polymer solution must be employed. Effective dispersions are readily formed by mechanical, air and/or hydraulic means for inducing agitation. For instance, the polymer may be dispersed at the prop of an outboard motor or in a hydraulic stream within a given zone to be treated.

Following application of the polymer, the trivalent metal ion is incorporated in an amount from about 5 to about 80 parts, preferably from about 15 to about 40 parts, per million parts by weight of the system. The metal ion is applied with agitation similar to that used for dispersing the polymer.

Subsequently, the saline suspension is treated with a second dose of a high molecular weight, carboxylic polyelectrolyte in an amount from about 0.1 to about 20 parts, preferably from about 2 to about 8 parts, per million by weight of the system treated.

Upon completion of the third addition of reagent, flocculation occurs very rapidly with the formation of heavy, readily settled flocs. Most significantly, the final treatment results in a substantial and very efficient reduction in turbidity of the settled overhead thus restoring visibility to the suspending medium, e.g., sea water. The following specific embodiments further illustrate the invention.

EXAMPLE 1

A sea bottom colloidal sediment was stirred into an aliquot of sea water contained in a 12″ x 20″ x 12″ aquarium at room temperature. The quantity of mud added was sufficient to produce a layer about 2.54 centimeters deep, when settled out. On a dry solids basis, the amount of solids in the saline suspension was estimated to be about 7 grams per liter.

The mixture of mud and sea water was agitated by means of an air-sparger. To the agitated mixture was added approximately 10 parts per million by weight of an acrylamide polymer characterized by partial hydrolysis of approximately 30 percent by weight of the initially available carboxamide groups to sodium carboxylate groups and a molecular weight of at least about 2,000,000. A large floc of suspended solids was formed almost immediately, but considerable fines remained in suspension to substantially impair visibility.

Aluminum sulfate was then added to the suspension in an amount of 70 parts per million by weight. With continued air induced agitation, the floc size gradually reduced. After about 5 minutes a second aliquot of the above described flocculant polymer was added tot he suspension in an amount of 5 parts per million by weight.

The floc immediately grew in size and settled very rapidly. Shortly after the third addition of reagent, the floc had completely settled leaving a clear supernatant with a turbidity of less than 10 Hellige units as measured with a "Turbidimeter," Hellige Inc.

EXAMPLES 2–11

A series of comparative flocculation treatments were carried out to demonstrate the unique results obtained with the specified combintion of flocculants. The flocculation procedure and dosing of reagents was the same as that described in Example 1. In the following table, the column reporting floc properties is based on observations of their settling rate and stability, i.e. the relative ease with which the floc was broken down and resuspended on continued agitation of the system. It is to be understood such observations are qualitatively related to the other results obtained in the same series of experiments. Examples 2–3 illustrate, in comparison to the remaining examples, the importance of the combination treatment and polymer composition parameters of the invention.

solution viscosity in 4% by weight sodium chloride, at pH 7, of at least about 10 centipoises, as measured with an Ostwald viscosimeter at 25° C.

Other reagents that may be employed in place of alum to introduce trivalent metal salts in solution include sodium aluminate, ferric chloride, ferrous chloride (to be oxidized in situ to the ferric ion) and ferric sulfate.

What is claimed is:

1. A method for clarifying saline suspensions of suspended solids which comprises adding to the suspension in the following sequence and with intervening agitation of the suspension following each addition (1) a high molecular weight, carboxyl containing anionic polyelectrolyte, (2) trivalent metal ions and (3) a second dose of a high molecular weight, carboxyl containing, anionic polyelectrolyte.

2. A method as in claim 1 wherein the anionic polyelectrolyte is applied in each application at a dose from about 0.1 to about 20 parts per million and the trivalent metal ion is added in an amount from about 5 to about 80 parts per million, said doses being based on the weight of the system treated.

3. A method as in claim 1 wherein the anionic polyelectrolyte is an anionic copolymer of acrylamide and an alkali metal or ammonium acrylate.

4. A method as in claim 1 wherein the saline aqueous

TABLE I.—FLOCCULATION OF SEA WATER-MUD SYSTEM

| Example No. | Flocculation Treatment | | | Supernatant Turbidity (Hellige Units) | Floc Properties |
|---|---|---|---|---|---|
| | Step 1 | Step 2 | Step 3 | | |
| 2 | ACOOH[1] | Alum | ACOOH | 9.4–12 | Fast settling, stable. |
| 3 | A'COOH[1] | do | A'COOH | 21 | Do. |
| 4 | NCONH$_2$[2] | do | NCONH$_2$ | 16 | Slow settling. |
| 5 | N'CONH$_2$[3] | do | N'CONH$_2$ | 25 | Do. |
| 6 | ASO$_3$[4] | do | ASO$_3$ | 40 | Do. |
| 7 | Alum | ACOOH | | 35–50 | Stable floc. |
| 8 | do | A'COOH | | 46 | |
| 9 | do | NCONH$_2$ | | 21 | Slow settling. |
| 10 | CNH$_3$[5] | Alum | CNH$_3$ | Cloudy | No flocculation. |
| 11 | C'NH$_3$[6] | do | CNH$_3$ | Cloudy | Do. |

[1] ACOOH and A'COOH represent carboxyl containing anionic polyelectrolytes in the form of 70/30 copolymers of acrylamide and sodium acrylate obtained by partially hydrolyzing polyacrylamides. Their molecular weights are estimated to be about 2 and 10 million respectively.
[2] NCONH$_2$ represents a polyacrylamide having about 6 percent of the amide groups hydrolyzed to sodium carboxylate groups and a molecular weight estimated to be about 2 million.
[3] N'CONH$_2$ is an essentially nonionic polyacrylamide having a molecular weight of about 1,000,000.
[4] ASO$_3$ is an anionic sulfonate containing polyelectrolyte in the form of a polystyrene sulfonate, having an estimated molecular weight of at least 6,000,000.
[5] CNH$_3$ represents a polyamine condensation product of a polyalkylene polyamine and ethylene dichloride with an estimated molecular weight of about 50,000.
[6] C'NH$_3$ represents a polyethylenimine with an estimated molecular weight of about 100,000.

In addition to the carboxyl containing polyelectrolytes described above, alkali metal and ammonium salts of copolymers of styrene and maleate, alkali metal acrylate homopolymers and copolymers thereof with up to about 90 mole percent of other monomers copolymerizable therewith, such as 80/20, 50/50, 30/70 and 15/85 copolymers of sodium acrylate and acrylamide, methacrylamide, pyrrolidinone and oxazolidinone and water-soluble copolymers of alkali metal acrylates, such as potassium or sodium acrylate, with water-insoluble monomers such as ethylene, styrene, and vinyl acetate can be substituted for the anionic polymers employed above to achieve similar results. The essential overall qualification on such polymers is that they be characterized by high molecular weights of at least about 200,000 and water solubility. The latter term, as used herein, means being dispersible in water to produce a visually homogeneous and transparent solution. For the purposes of the instant invention, satisfactory polymers will be characterized by a suspension is a suspension of bottom sediment in sea water.

5. A method as in claim 1 wherein the flocculating conditions involve sparging air into the flocculation zone.

6. A method as in claim 1 wherein the sequential addition of reagents is carried out at time intervals and under flocculating conditions to allow for intervening floc formation.

References Cited

UNITED STATES PATENTS

| 3,118,832 | 1/1964 | Katzer et al. | 210—54 |
| 3,276,998 | 10/1966 | Green | 210—53 X |
| 3,338,828 | 8/1967 | Clark | 210—53 X |
| 3,377,274 | 4/1968 | Burke et al. | 210—53 |

MICHAEL E. ROGERS, Primary Examiner

U.S. Cl. X.R.

210—53